United States Patent [19]

Bergum

[11] 3,907,588

[45] Sept. 23, 1975

[54] ELECTROCHEMICAL CELL AND SAFETY RESISTOR THEREFOR

[75] Inventor: Bernard C. Bergum, Monona, Wis.

[73] Assignee: ESB Incorporated, Philadelphia, Pa.

[22] Filed: Jan. 21, 1970

[21] Appl. No.: 4,560

[52] U.S. Cl. ................................. 136/6 R; 136/181
[51] Int. Cl.² ........................................ H01M 35/00
[58] Field of Search ......... 136/6, 83, 102, 107, 166, 136/24, 28, 134, 135, 181, 182

[56] References Cited
UNITED STATES PATENTS

| | | | |
|---|---|---|---|
| 1,094,156 | 4/1914 | Lowe | 136/181 |
| 1,219,411 | 3/1917 | Williams | 136/181 |
| 1,264,520 | 4/1918 | Holmes | 136/181 |
| 2,453,865 | 11/1944 | Schmidt | 136/181 |
| 2,653,180 | 9/1953 | Hignett et al. | 136/28 |
| 2,876,271 | 3/1959 | Cahoon | 136/181 |
| 3,080,440 | 3/1963 | Ruetschi et al. | 136/6 |

OTHER PUBLICATIONS
Engineering Physical Metallurgy, Heyer, 1939, p. 140.

*Primary Examiner*—John H. Mack
*Assistant Examiner*—C. F. LeFevour
*Attorney, Agent, or Firm*—Robert H. Robinson, Esq.; Anthony J. Rossi, Esq.

[57] ABSTRACT

An electrochemical cell is disclosed having a resistive element interposed between a cell electrode and its corresponding terminal. The resistive element acts as a safety resistor and is a high resistivity material which has a high temperature coefficient of resistance. The element significantly lessens the high flash amperage current which is characteristic of some electrochemical cells, such as nickel-cadmium cells. The resistance of the element preferably has a value as determined in accordance with the equation:

$$R_a = \frac{E}{I_p} - \frac{E}{I_i}$$

where $R_a$ is the ohmic value of the element; $E$ is the open circuit voltage of the cell; $I_i$ is the initial flash current of the cell in the absence of the element; and $I_p$ is the flash current of the cell with the element present in the cell.

12 Claims, 2 Drawing Figures

INVENTOR.
Bernard C. Bergum

ELECTROCHEMICAL CELL AND SAFETY RESISTOR THEREFOR

In recent years a new generation of batteries has come on to the consumer market to power a variety of objects such as toys, electrical toothbrushes, etc. The cells normally are rechargeable and have relatively high capacities. A drawback of some of these cells, however, is the fact that they have a dangerously high flash amperage current so that should such a cell be accidentally short-circuited there is the possibility of injury occurring.

Attempts in the past to correct this drawback have included interposing a fuse between one of the cell electrodes and its terminal contact. Such fuses operate in the normal way, wherein the fuse blows upon an excessive flow of current or upon a certain gas pressure buildup within the cell. When the fuse blows in the cell, the cell is no longer operative and a new one must be purchased. Another device used to correct the high flash amperage current in such cells involves the use of a thermo switch which breaks contact when it reaches a certain temperature. When the temperature of the cell returns to normal the thermo switch will again make contact and the cell will be operative. However, these switches are both expensive and bulky and therefore are used only in large batteries.

Although the overall aim in these attempts has been to overcome the dangerously high flash amperage current, efforts have also been directed to being certain that the internal resistance of the cell is not affected to any substantial degree by the fuse or the thermo switch or whatever device is used. This is based on the reasoning generally accepted in the industry that by increasing the internal resistance one would then affect the polarization ability of the electrodes as well as affect the rate of diffusion in the cell.

This invention, therefore, is apparently contrary to the teaching of the art since it involves placing a resistive element between a cell electrode and its terminal which has the result of increasing the internal resistance of the cell. However, as will be shown in the discussion later on, the safety resistive element of this invention does not deleteriously affect the operating characteristics of the cell, but does significantly lessen the chance of a large flash current occurring should the cell be accidentally short-circuited.

SUMMARY OF THE INVENTION

The basic purpose of this invention is to eliminate substantially the high flash amperage current of electrochemical cells which have this characteristic while at the same time not deleteriously affect the cell performance. In achieving this purpose it is an object of the invention to select a suitable resistive element and place it in series between at least one cell electrode and its terminal contact whereby the apparent internal resistance of the cell is increased a certain amount. The increase in internal resistance, however, is designed not to detract from the operating characteristics of the cell.

A further object of the invention is to provide a safety resistive element in an electrochemical cell which both significantly reduces the large flash amperage current and prevents too large a discharge from being delivered to the load during normal use of the cell. This is achieved by the proper selection of materials so that the resistive element has a high temperature coefficient of resistance whereby as the element heats up during use of the cell, the resistance increases, and as a result the maximum current flow of the cell is restricted to a safe level.

It is also a further object of the invention to provide a rather inexpensive device for inhibiting the occurrence of a large flash amperage current wherein the device comprises a resistive element which stays intact when the cell is short-circuited or subjected to an extremely high drain. Since the resistive element stays intact the cell remains operative after it has been subjected to the short-circuiting or heavy drain.

DESCRIPTION OF THE PREFERRED EMBODIMENTS

This invention basically lies in providing a safety resistive element in electrochemical cells capable of high flash amperages, such as nickel-cadmium cells. Throughout this discussion the safety resistive element will be referred to briefly as a safety resistor. In one embodiment of the invention, a safety resistor is connected internally between the positive electrode of the cell and its terminal contact. An alternative construction involves housing a fully assembled cell in a separate container and connecting the safety resistor externally wherein the resistor is welded to one terminal of the assembled cell and to the corresponding contact which acts as the terminal of the outer container. Therefore, this connection is external to the assembled cell but is internal to the separate container. In both embodiments, a second safety resistor can be included connecting the negative electrode with its terminal. The cell shown in the Figures is a nickel-cadmium cell and the following discussion will be with respect thereto, however, it should be noted that this invention is not to be construed as limited to nickel-cadmium cells but is equally applicable to other electrochemical cells.

Figure 1:
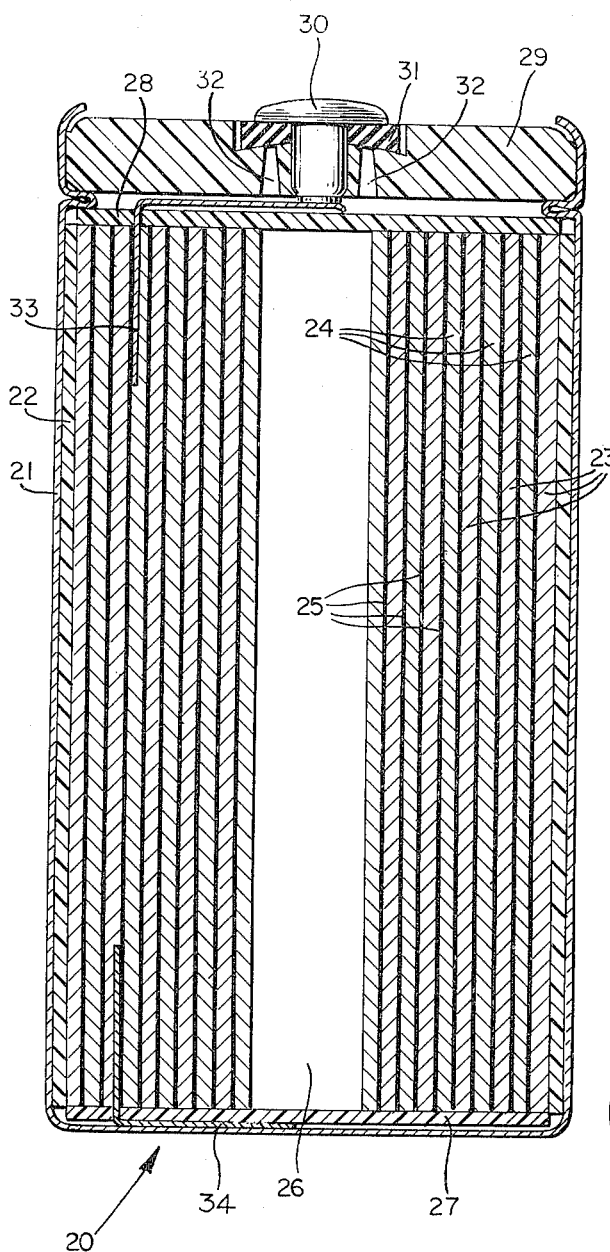
FIG. 1 is a drawing of a cell of this invention having a safety resistor internally connected between the positive electrode and its terminal.

Turning now to FIG. 1 there is shown an assembled nickel-cadmium cell of this invention having a safety resistor connected between the positive electrode and the positive terminal of the cell. The cell is a spirally wound cell wherein the nickel electrode and the cadmium electrode with a separator between the two are all rolled into a spiral. Therefore, the cell is shown as 20 with a metallic container 21 which has a plastic insulating liner 22 on the inside thereof. The container 21 preferably is nickel-plated steel and the liner 22 is polyvinyl chloride. Appropriate materials may readily be substituted for these. The cadmium electrode is shown at 23 and since it is spirally wound it is shown as a series of layers. The spirally wound nickel electrode is shown at 24 and it also appears as a series of layers with a separator 25 between each layer of cadmium electrode and nickel electrode. The separator is preferably made of non-woven nylon or other synthetic materials such as polypropylene. In the center of the coiled arrangement of electrodes and separator is an open area 26 which is provided to facilitate welding as will be subsequently discussed. Plastic insulators are shown lining the bottom of the cell container and along the top of the coiled electrodes and separator at 27 and 28 respectively. Again, these plastic insulators are preferably poly vinyl chloride although other suitable materials can be used.

The cell is sealed by means of a plastic closure 29 which has a metallic stud 30 passing through the center thereof. The cell container is crimped over at the top to hold the cell closure in place and a rubber O ring is shown at 31 under the top of the terminal stud. The holes 32 are used as vent holes for the cell. Shown connecting the terminal stud to the positive electrode is the safety resistor 33. This is preferably a strip of metallic material with the proper dimensions to give it a resistance which is able to inhibit high flash amperages of the cell should it be accidentally short-circuited while not affecting the operating characteristics of the cell when it is put to normal use. The safety resistive element is normally welded at one end to the terminal cap and at the other end to the positive electrode.

A material that has been found suitable for the resistive element has been a cobalt-nickel alloy comprising 84% Co, 12% Mn, and 4% Ni. In normal operation of the cell, the polarization ability of the negative and positive electrodes as well as the diffusion rate in the cell are not deleteriously affected by the presence of the safety resistor. An important feature of having the safety resistor welded to the electrode internally to the cell is the fact that the cell electrode can now act as a heat sink since it has a relatively high surface area and is capable of dissipating large amounts of heat which can be generated upon short-circuiting or heavy drains of the cell. Also, the preferred materials have a high temperature coefficient of resistance whereby a heavy current flow causes the resistor to heat up which, in turn, increases its resistance. Since the safety resistor is internal to the battery, it must be non-corrosive in the electrolyte.

It is contemplated that a second safety resistor 34 may be welded to the negative electrode and the bottom of the metal container 21 which serves as the negative terminal of the cell. This second safety resistor is the same material as the first and the double safety arrangement is normally used in the larger cells such as the D size. In smaller cells the second safety resistor may be deleted.

This second safety resistor may be welded to the bottom of the container 21 by means of a welding probe which is lowered down the open area 26 and into contact with the end of the safety resistor that is to be welded to the container. After this welding takes place and other elements are assembled, the first safety resistor 33 is welded to the stud 30 and the cell is sealed by the closure 29. Such a double safety resistor arrangement would allow both electrodes to serve as heat sinks for heat generated in the cell during use.

Figure 2:
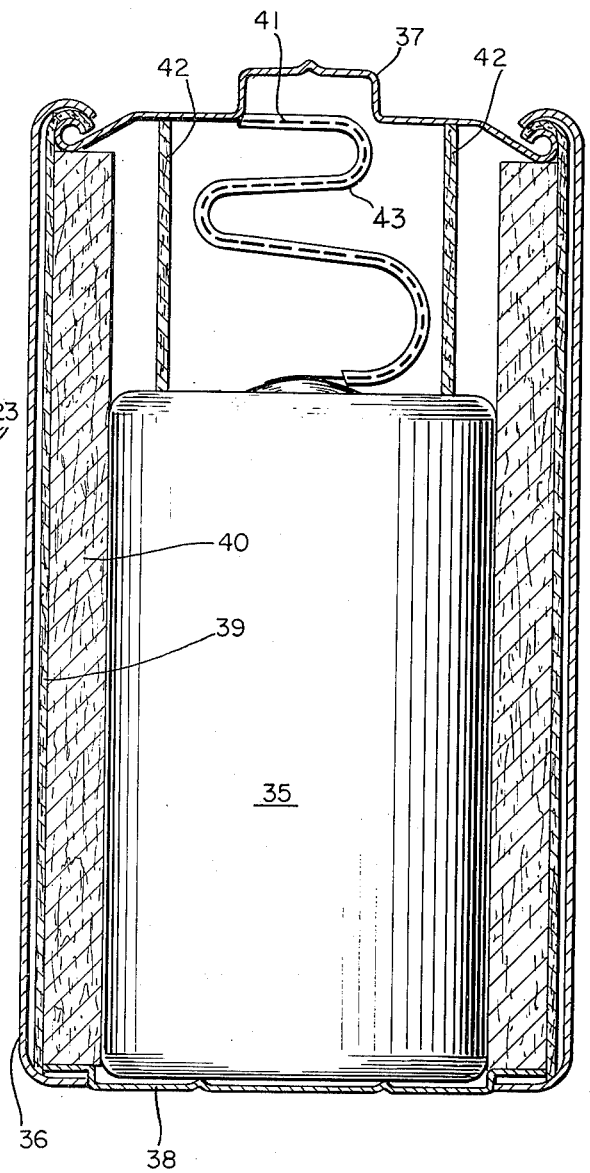
FIG. 2 is a drawing of an alternate construction wherein a sub-C size cell is housed in a D size cell container with a resistive element connecting the positive cell terminal and the corresponding terminal of the container.

FIG. 2 illustrates an alternative construction of this invention wherein a fully assembled cell is housed in a larger cell container. As an example, the Figure can be considered as showing a nickel-cadmium, sub-C size cell in a D size container. This is done in order to meet consumer applications which require a cell having the physical size of a D cell but the electrical characteristics of a sub-C cell. The cell in the Figure does not have a safety resistor internally connecting an electrode with its terminal, but rather the positive cell terminal is connected to the positive terminal of the container by means of a safety resistor.

Therefore, the cell 35 is shown inside the container 36 which is closed at the top by the positive terminal cap 37 and at the bottom by the negative terminal plate 38. The container is lined by a paper liner 39 and a paper tube 40 surrounds the cell 35. The safety resistor 41 connects the cell positive terminal cap of the container and thereby provides a resistive path to eliminate substantially any flash amperage current and to prevent the occurrence of too heavy a drain on the cell on load. The safety resistor is welded to the cell terminal and to the terminal cap of the container. A paper spacer tube 42 is placed on top the cell 35 and beneath the cap 37 in order to keep the cell in place. It should be noted that a second safety resistor may also be incorporated in this construction wherein this second resistor would connect the negative terminal of the cell with the negative terminal plate of the container.

The choice of materials used for the safety resistor 41 in this construction is somewhat broader than in FIG. 1 since the safety resistor does not come into contact with the cell electrolyte and therefore the requirement that it be non-corrosive in the electrolyte is no present. A material that has been used successfully as the safety resistor of FIG. 1 is an alloy of 80% Ni and 20% Cr. This particular material has a resistivity of 650 ohms per circular milfoot at 20°C and normally is a ribbon three-sixteenth inch wide and 0.006 inch thick. The length of the strip is varied, depending on the resistance desired.

As an added safety protective measure, an insulating material is usually fitted as a sleeve onto the safety resistors of both Figures. Such an insulating sleeve is illustrated at 42 in FIG. 2. Preferably, this insulating material should be able to withstand temperatures well above the temperature which the safety resistor reaches upon direct shorting of the cell. A material found to be suitable for this insulating material is made of woven glass which is capable of withstanding temperatures up to 650°C.

It is preferable that the safety resistor have the dimensions which will give it a resistance of between 0.03 to about 0.15 ohms. Naturally, such factors as the resistivity of the chosen material will determine the exact dimensions of the resistive element.

In quantitative terms, the resistance value of the safety resistor may be expressed mathematically as $$R_a = \frac{E}{I_p} - \frac{E}{I_i}$$

where $R_a$ is the resistance added to the cell to limit flash current; $E$ is the open circuit voltage of the cell; $I_i$ is the initial flash current of the cell in the absence of the safety resistor, and $I_p$ is the flash current of the protected cell with $R_a$ added thereto.

EXAMPLE

As an example of this invention, a sub-C size cell was placed within a larger cell container such as a C or D size container and measurements were taken of cell voltages of a series of cells having no safety resistor and of cells having safety resistors which increased the cell impedance by different amounts. The cell itself has an impedance of 0.12 ohm and therefore the cells in series No. 1 below had no safety resistor and had an impedance of 0.12 ohm and a flash amperage current of 46 amperes. Series No. 2 had a safety resistor which was an alloy of 80% Ni and 20% Cr and which was cut to the proper length to raise the overall impedance to 0.19 ohm and to reduce the flash amperage current to 12 amperes. Series No. 3 cells had a somewhat larger piece of the same material for a safety resistor and the impedance of these cells was measured as 0.25 ohm with a flash amperage current of 8 amperes.

In the following table, the voltages of these series of cells were measured over a period of time during which the cells were connected to a load and subjected to a 100 milliamperes drain.

| Time (hrs.) | Voltage | | |
|---|---|---|---|
| | Series No. 1 | Series No. 2 | Series No. 3 |
| 0 | 1.360 | 1.340 | 1.340 |
| 2 | 1.300 | 1.280 | 1.275 |
| 4 | 1.280 | 1.270 | 1.260 |
| 6 | 1.270 | 1.260 | 1.246 |
| 8 | 1.250 | 1.240 | 1.230 |
| 10 | 1.235 | 1.230 | 1.210 |
| 12 | 1.220 | 1.210 | 1.200 |

As the above table shows, this invention clearly provides a cell construction which significantly reduces the flash amperage current while not deleteriously affecting the normal operating characteristics of the cell.

Although the foregoing discussion has been related to a particular embodiment involving a nickel-cadmium cell system, this invention clearly is not limited thereto. The invention is readily applicable to other cell systems and includes within its scope all modifications and variations apparent to those skilled in the art.

What I claim is:

1. An electric cell having a pair of electrodes of opposite polarity, a separator between said electrodes, an electrolyte, and terminals for connecting said cell in a circuit, and a resistive element interposed in the current path connecting one of said electrodes with one of said terminals, said resistive element being made of a metallic material of high resistivity, said resistive element being internally connected between said electrode and said terminal, said resistive element being non-corrosive in said electrolyte and being capable of limiting the maximum discharge current of said cell to a safe level while not affecting the normal cell characteristics and providing sufficient resistance to reduce the flash amperage current of said cell to a safe level, said resistive element having a value as determined by the equation:

$$R_a = \frac{E}{I_p} - \frac{E}{I_i}$$

where $R_a$ is the ohmic value of said resistive element, $E$ is the open circuit voltage of said cell; $I_i$ is the initial flash current of said cell in the absence of said resistive element in said current path; and $I_p$ is the flash current of said cell with said resistive element in said current path, said resistive element being made of an alloy material comprising 84% Co, 12% Mn, and 4% Ni and having a resistance in the range of about 0.03 ohm to about 0.15 ohm.

2. An electrical cell having a pair of electrodes of opposite polarity, a separator between said electrodes, an electrolyte, and terminals for connecting said cell in a circuit, and a resistive element interposed in the current path connecting one of said electrodes with one of said terminals, said resistive element being made of a metallic material of high resistivity and providing sufficient resistance to reduce the flash amperage current of said cell to a safe level, said resistive element having a value as determined by the equation:

$$R_a = \frac{E}{I_p} - \frac{E}{I_i}$$

where $R_a$ is the ohmic value of said resistive element; $E$ is the open circuit voltage of said cell; $I_i$ is the initial flash current of said cell in the absence of said resistive element in said current path, said resistive element being made of an alloy comprising 80% Ni and 20% Cr and having a resistance in the range of about 0.03 ohm to about 0.15 ohm, and $I_p$ is the flash current of said cell with said resistive element in said current path and wherein a fully assembled sealed cell is housed within a battery container having two terminal contacts said resistive element connecting one cell electrode terminal with the corresponding terminal contact of said battery container, said resistive element providing sufficient additional resistance to the overall cell impedance to reduce the maximum discharge current to a safe level while having essentially no effect on the normal cell operating characteristics.

3. An electric cell having a container, a pair of electrodes of opposite polarity (positive and negative), a separator between said electrodes, an electrolyte, two terminals (positive and negative) for connecting said cell in a circuit, and a resistive element within the cell container interposed in the current path connecting at least one of said electrodes with one of said terminals, said resistive element being made of a metallic material of high resistivity and being in physical contact with said electrode to which it is connected whereby the electrode acts as a heat sink to dissipate heat generated by the current flowing through the resistive element, and said resistive element being non-corrosive in said electrolyte and having a high temperature coefficient of resistance whereby as the element heats up during use of the cell the resistance increases and restricts the maximum current flow to a safe level.

4. An electric cell of claim 3 wherein the resistance value of said resistive element is determined by the equation:

$$R_a = \frac{E}{I_p} - \frac{E}{I_i}$$

where $R_a$ is the ohmic value of said resistive element; $E$ is the open circuit voltage of said cell; $I_i$ is the initial flash current of said cell in the absence of said resistive element in said current path; and $I_p$ is the flash current of said cell with said resistive element in said current path.

5. An electric cell of claim 4 wherein $R_a$ ranges from about 0.03 ohm to about 0.15 ohm.

6. An electric cell of claim 4 wherein there are two resistive elements, one being connected to the positive electrode and the positive terminal and the other being connected to the negative electrode and the negative terminal.

7. An electric cell of claim 4 wherein there is an insulating material enclosing said resistive element, said insulating material being capable of withstanding temperatures up to 650°C.

8. An electric cell of claim 6 wherein $R_a$ for both resistive elements ranges from about 0.03 ohm to about 0.15 ohm.

9. An electric battery comprising a battery container and having at least one fully assembled sealed cell within said battery container, said battery container having two terminal contacts for making electrical contact with the positive and negative cell terminals, a resistive element connecting at least one cell terminal with the corresponding terminal contact of said battery container, said resistive element being made of a metallic material having a high resistivity and a high temperature coefficient of resistance whereby as the element heats up during use of the battery the resistance increases and restricts the maximum current flow of the battery to a safe level.

10. An electric battery of claim 9 wherein the resistance value of said resistive element is determined by the equation:

$$R_a = \frac{E}{I_p} - \frac{E}{I_t}$$

where $R_a$ is the ohmic value of said resistive element; $E$ is the open circuit voltage of the battery; $I_t$ is the initial flash current of the battery with said resistive element.

11. An electric battery of claim 10 wherein $R_a$ ranges from about 0.03 ohm to about 0.15 ohm.

12. An electric battery of claim 10 wherein there are two resistive elements, one being connected to a positive cell terminal and the positive battery terminal and the other being connected to a negative cell terminal and the negative battery terminal.

* * * * *